(12) United States Patent
Noda et al.

(10) Patent No.: US 8,157,276 B2
(45) Date of Patent: Apr. 17, 2012

(54) CYLINDER APPARATUS

(75) Inventors: Kenji Noda, Yokohama (JP); Yoshiaki Totani, Yokohama (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 94 days.

(21) Appl. No.: 12/785,671

(22) Filed: May 24, 2010

(65) Prior Publication Data

US 2010/0301578 A1  Dec. 2, 2010

(30) Foreign Application Priority Data

May 28, 2009  (JP) ................................ 2009/128905

(51) Int. Cl.
*B60G 21/05* (2006.01)
(52) U.S. Cl. ............................................... 280/124.106
(58) Field of Classification Search ........... 280/124.106, 280/124.107, 124.157, 124.158, 124.159, 280/124.16, 5.506, 5.507, 5.508, 5.511, 5.519; 188/266.1, 266.2, 266.5
See application file for complete search history.

(56) References Cited

U.S. PATENT DOCUMENTS

| 4,411,334 | A | * | 10/1983 | Schlanger | 180/274 |
|---|---|---|---|---|---|
| 4,752,062 | A | * | 6/1988 | Domenichini | 267/186 |
| 5,150,915 | A | * | 9/1992 | Hoptry et al. | 188/266.4 |
| 7,997,588 | B2 | * | 8/2011 | Ohnuma et al. | 280/5.519 |
| 2001/0013451 | A1 | * | 8/2001 | Grundei | 188/316 |
| 2009/0242339 | A1 | * | 10/2009 | Nakadate et al. | 188/266.5 |

FOREIGN PATENT DOCUMENTS

JP            10-61708       3/1998

* cited by examiner

*Primary Examiner* — Faye M. Fleming
(74) *Attorney, Agent, or Firm* — Wenderoth, Lind & Ponack, LLP

(57) ABSTRACT

A piston coupled to a piston rod is inserted in a cylinder, and an outer cylinder is disposed around the cylinder so as to define a reservoir therebetween. A separator tube is disposed around the cylinder so as to define an annular passage therebetween. The piston rod can be locked and unlocked by closing and opening an electromagnetic open/close valve so as to block and allow a flow of hydraulic fluid through a flow passage between the annular passage and the reservoir. The separator tube has a greater thickness. O-rings are disposed so as to provide seals between the separator tube and the cylinder. The separator tube extends to positions such that the ends of the separator tube overlap a base valve and a rod guide, thereby holding the respective ends of the cylinder. Due to this configuration, it is possible to prevent deformation of the cylinder and the separator tube due to an increase in the hydraulic pressure.

10 Claims, 4 Drawing Sheets

CYLINDER APPARATUS

BACKGROUND OF THE INVENTION

1. Technical Field

The present invention relates to a cylinder apparatus.

2. Description of the Related Art

As a conventional art, for example, there is a cylinder apparatus disclosed in Japanese Patent Public Disclosure No. HEI 10-61708. This cylinder apparatus comprises a cylinder, and a cylindrical separator tube disposed around the cylinder so as to cover the cylinder with a space defined therebetween. In this cylinder, an annular passage of hydraulic fluid is defined between the cylinder and the separator tube with the aid of seal members providing seals between the inner circumferences of the respective ends of the separator tube and the outer circumference of the cylinder. The seal members are fixedly attached by, for example, staking or swaging of the separator tube.

There is the following problem in the cylinder apparatus having the annular passage of hydraulic fluid defined between the cylinder and the separator tube, like the one disclosed in Japanese Patent Public Disclosure No. HEI 10-61708; that is, due to an excessive increase in the hydraulic pressure, the separator tube may be deformed and the seal members may be extracted from or fall out of the cylinder.

SUMMARY OF THE INVENTION

Therefore, an object of the present invention is to provide a pressure-resistant cylinder apparatus capable of preventing deformation of a cylinder and a separator tube which otherwise could be caused by an increase in a hydraulic pressure.

To achieve the foregoing and other objects, the present invention provides a cylinder apparatus, comprising:

a cylinder sealingly containing hydraulic fluid;

a piston slidably inserted in the cylinder, the piston dividing the interior of the cylinder into a first chamber and a second chamber;

a piston rod coupled to the piston, the piston rod having an end extending to the outside of the cylinder;

a separator tube disposed around the cylinder, the separator tube defining an annular passage between the separator tube and the cylinder, the annular passage connected to the interior of the cylinder;

an outer cylinder disposed around the separator tube, the outer cylinder defining a reservoir between the outer cylinder and the separator tube, the reservoir sealingly containing the hydraulic fluid and gas;

a first member including a first fitted portion fitted inside an end of the cylinder, the first member separating the first chamber and the reservoir;

a second member including a second fitted portion fitted inside an opposite end of the cylinder, the second member separating the second chamber and the reservoir;

a passage allowing a flow of the hydraulic fluid via the annular passage by a sliding movement of the piston in the cylinder;

a valve unit disposed at the passage;

a third fitted portion formed at an end of the separator tube, the third fitted portion fitted to the outer circumference of the cylinder;

a fourth fitted portion formed at an opposite end of the separator tube, the fourth fitted portion fitted to the outer circumference of the cylinder;

a first seal member disposed in a first inner circumferential groove formed at the third fitted portion, the first seal member providing a seal between the separator tube and the cylinder; and a second seal member disposed in a second inner circumferential groove formed at the fourth fitted portion, the second seal member providing a seal between the separator tube and the cylinder;

wherein the end of the separator tube extends to a position adjacent to the first member, such that the end of the cylinder is pressed against the first fitted portion of the first member fitted inside the end of the cylinder from the outer circumferential side thereof by the third fitted portion formed at the end of the separator tube; and the opposite end of the separator tube extends to a position adjacent to the second member, such that the opposite end of the cylinder is pressed against the second fitted portion of the second member fitted inside the opposite end of the cylinder from the outer circumferential side thereof by the fourth fitted portion formed at the opposite end of the separator tube.

DETAILED DESCRIPTION OF THE INVENTION

Figure 1:
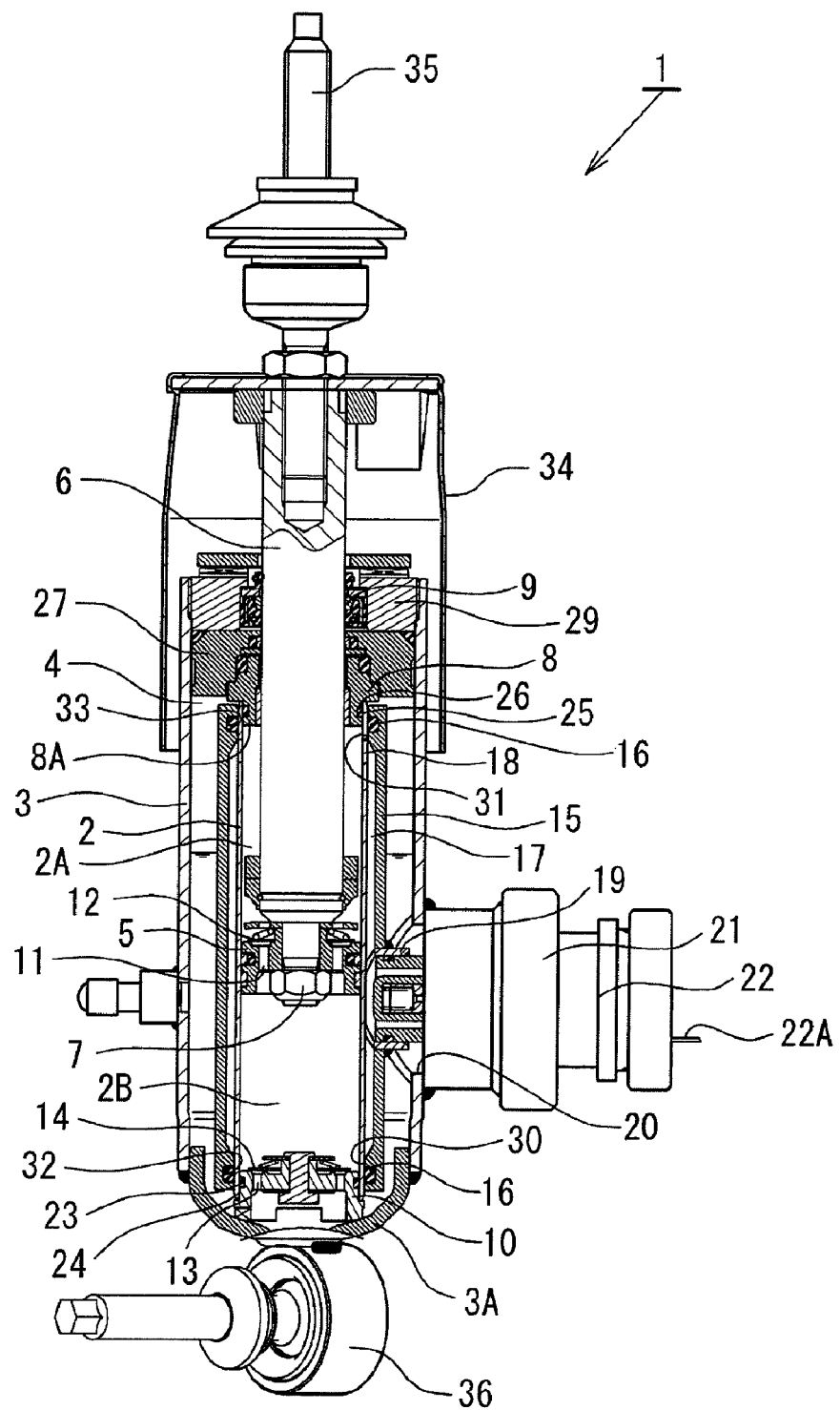
FIG. 1 is a vertical cross-sectional view illustrating a cylinder apparatus according to a first embodiment of the present invention.
Figure 2:
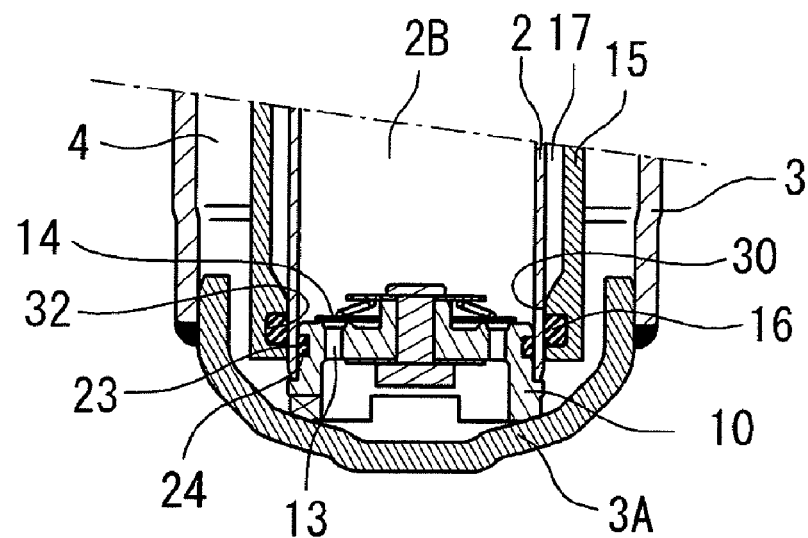
FIG. 2 is an enlarged view illustrating a base portion of the cylinder apparatus shown in FIG. 1.

Hereinafter, an embodiment of the present invention will be described in detail with reference to the accompanying drawings. Referring to FIGS. 1 and 2, a cylinder apparatus of the present embodiment will now be described. As shown in FIG. 1, a cylinder apparatus 1 has a double cylinder structure comprising a cylinder 2, a bottomed cylindrical outer cylinder 3 disposed around the cylinder 2, and an annular reservoir 4 defined between the cylinder 2 and the outer cylinder 3. A piston 5 is slidably inserted in the cylinder 2. The interior of the cylinder 2 is divided by the piston 5 into two chambers, a cylinder upper chamber 2A which is the first chamber, and a cylinder lower chamber 2B which is the second chamber. One end of a piston rod 6 is connected to the piston 5 by a nut 7. The other end of the piston rod 6 extends through the cylinder upper chamber 2A, extends through a rod guide 8 and an oil seal 9 attached to the upper ends of the cylinder 2 and the outer cylinder 3, and then protrudes to the outside of the cylinder 2. The rod guide 8 as the first member separates the cylinder upper chamber 2A and the reservoir 4. A base valve 10 as the second member is attached to the lower end of the cylinder 2, thereby separating the cylinder lower chamber 2B and the reservoir 4.

The piston 5 is provided with a hydraulic passage 11 through which the cylinder upper and lower chambers 2A and 2B are in communication with each other. A check valve 12 is disposed at the hydraulic passage 11 for allowing only a flow of hydraulic fluid from the cylinder lower chamber 2B side to the cylinder upper chamber 2A side. Due to the provision of the check valve 12, the hydraulic fluid can flow through the piston 5 only from the cylinder lower chamber 2B side to the cylinder upper chamber 2A side, and cannot flow in the reverse direction. Further, the base valve 10 is provided with a hydraulic passage 13 through which the cylinder lower chamber 2B and the reservoir 4 are in communication with each other. A check valve 14 is disposed at the hydraulic passage 13 for allowing only a flow of the hydraulic fluid from the reservoir 4 side to the cylinder lower chamber 2B side. Due to the provision of the check valve 14, the hydraulic fluid can flow through the base valve 10 only from the reservoir 4 side to the cylinder lower chamber 2B side, and cannot flow in the reverse direction. The cylinder 2 sealingly contains the hydraulic fluid, and the reservoir 4 sealingly contains the hydraulic fluid and gas. When the gas is sealingly contained therein, the pressure thereof is the same as the atmospheric pressure.

A separator tube 15 is disposed so as to cover the outer circumference of the cylinder 2 with a space defined between the cylinder 2 and the separator tube 15. O-rings 16, which are the seal members, are disposed so as to provide seals between the respective ends of the separator tube 15 and the cylinder 2, whereby an annular hydraulic passage 17 is defined between the cylinder 2 and the separator tube 15. The annular hydraulic passage 17 is in communication with the cylinder upper chamber 2A through a hydraulic passage 18 formed through the side wall of the cylinder 2 near the upper end of the cylinder 2. An opening 19 is formed through the side wall of the separator tube 15 at an intermediate position of the separator tube 15. An opening 20 is formed through the side wall of the outer cylinder 3 at a lower position of the outer cylinder 3, such that the opening 20 has a larger diameter than that of the opening 19 and is positioned coaxially with the opening 19. A cylindrical case 21 is attached at the opening 20 by welding. An electromagnetic open/close valve 22, which serves as a valve unit for opening and closing the flow passage between the annular hydraulic passage 17 and the reservoir 4, is attached to the case 21. The electromagnetic open/close valve 22 is embodied by a solenoid valve configured to open and close the flow passage by an application of an electric current to a coil thereof through a lead wire 22A.

As shown in FIG. 2, the lower end of the cylinder 2 is positionally fixed by being fitted to the outer circumference of the base valve 10. The base valve 10 is positionally fixed by abutting against a bottom 3A of the outer cylinder 3. An O-ring 24, which is a seal member fitted in an outer circumferential groove 23 of the base valve 10, provides a seal between the cylinder 2 and the base valve 10.

The upper end of the cylinder 2 is positionally fixed by being fitted to the outer circumference of a cylindrical portion 8A of the rod guide 8. An O-ring 26, which is a seal member fitted in an outer circumferential groove 25 of the cylindrical portion 8A, provides a seal between the cylinder 2 and the cylindrical portion 8A of the rod guide 8. The rod guide 8 is positionally fixed by being fitted inside an annular retaining member 27 which is fitted in the outer cylinder 3. Further, a cover member 29 is screwed in the opening end of the outer cylinder 3, thereby axially positionally fixing the base valve 10, the cylinder 2, the rod guide 8 and the retaining member 27. The oil seal 9 is attached to the inner circumference of the cover member 29.

Flange portions 30 and 31 are formed at the respective ends of the separator tube 15 at the inner circumferential side thereof. The inner circumferential surfaces of the flange portions 30 and 31 are fitted to the outer circumference of the cylinder 2. Inner circumferential grooves 32 and 33 are formed at the flange portions 30 and 31, and the O-rings 16 are fitted in the inner circumferential grooves 32 and 33. As shown in FIG. 2, the lower end of the separator tube 15, which is the other end of the separator tube 15, axially overlaps the base valve 10, and the tip of the flange portion 30 extends to the lower end of the outer circumferential groove 23 of the base valve 10. On the other hand, the upper end of the separator tube 15, which is the one end of the separator tube 15, axially overlaps the cylindrical portion 8A of the rod guide 8, and the tip of the flange portion 31 extends to the upper end of the outer circumferential groove 25 of the cylinder portion 8A. The separator tube 15 is thicker than the cylinder 2, and is made from carbon steel.

A part of the piston rod 6 protrudes from the outer cylinder 3 and the cylinder 2 to the outside thereof. A cylindrical dust cover 34 is attached to the piston rod 6 so as to cover this protruding part of the piston rod 6. A mounting portion 35 is disposed at the tip of the piston rod 6. A mounting eye 36 is disposed at the bottom 3A of the outer cylinder 3.

Now, a description will be given how the cylinder apparatus 1 configured as mentioned above functions.

When the piston rod 6 performs a stroke in the extension direction, the cylinder apparatus 1 functions as follows. A movement of the piston 5 in the cylinder 2 causes the check valve 12 of the piston 5 to be closed, and the hydraulic fluid in the cylinder upper chamber 2A to be pressurized to be then sent through the hydraulic passage 18 and the annular hydraulic passage 17 to be then sent into the reservoir 4 via the electromagnetic open/close valve 22. At this time, an amount of the hydraulic fluid corresponding to the movement of the piston 5 is supplied from the reservoir 4 into the cylinder lower chamber 2B by opening the check valve 14 of the base valve 10, and the gas in the reservoir 4 expands by an extent corresponding to the exit of the piston rod 6 from the cylinder 2, thereby enabling a so-called volume compensation in the cylinder 2.

When the piston rod 6 performs a stroke in the contraction direction, a movement of the piston 5 in the cylinder 2 causes the check valve 12 of the piston 5 to be opened, the check valve 14 of the hydraulic passage 15 of the base valve 10 to be closed, and the hydraulic fluid in the piston lower chamber 2B to be sent into the cylinder upper chamber 2A. At this time, an amount of the hydraulic fluid corresponding to the entry of the piston rod 6 into the cylinder 2 is sent from the cylinder upper chamber 2A into the reservoir 4 through the hydraulic passage 18, the annular hydraulic passage 17 and the electromagnetic open/close valve 22, like the flow route of the hydraulic fluid when the piston rod 6 performs an extension stroke. The gas in the reservoir 4 is compressed by an extent corresponding to the entry of the piston rod 6 into the cylinder 2, thereby enabling a so-called volume compensation in the cylinder 2.

When the electromagnetic open/close valve 22 is opened, the hydraulic fluid is allowed to flow from the cylinder upper chamber 2A side to the reservoir 4 side, whereby the piston rod 6 can freely extend and contract. When the electromagnetic open/close valve 22 is closed, the hydraulic fluid is prevented from flowing from the cylinder upper chamber 2A side to the reservoir 4 side, whereby the piston rod 6 is locked in both the extension and contraction directions. At this time, even if a force for moving the piston rod 6 in either the extension or contraction direction is applied, this force acts as a compression force to the hydraulic fluid filling the flow passage from the cylinder 2 to the electromagnetic open/close valve 22, whereby incompressibility of the hydraulic fluid enables a secure lock against a stroke of the piston rod 6.

The separator tube 15 of the cylinder 2 axially extends so as to cover the cylinder 2 and overlap the base valve 10 and the rod guide 8. Therefore, the side wall of the cylinder 2 defining the cylinder upper and lower chambers 2A and 2B is completely covered with the annular hydraulic passage 17 between the cylinder 2 and the separator tube 15. Due to this configuration, a differential pressure between the inside and outside hardly affects the side wall of the cylinder 2, thereby preventing deformation of the cylinder 2 which could otherwise be caused by the hydraulic pressure.

The O-ring 24 is retained in the outer circumferential groove 23 of the base valve 10, and the lower end of the cylinder 2 fitted to the outer circumference of the base valve 10 is pressed against the outer circumference of the base valve 10 from the outer circumferential side thereof by the flange portion 30 of the separator tube 15. Further, the O-ring 26 is retained in the outer circumferential groove 25 of the cylindrical portion 8A of the rod guide 8, and the upper end of the cylinder 2 fitted to the outer circumference of the cylindrical portion 8A is pressed against the outer circumference of the cylindrical portion 8A from the outside side thereof by the flange portion 31 of the separator tube 15. Due to this configuration, it is possible to prevent deformation of the respective ends of the cylinder 2, and enhance the seal performances of the O-rings 24 and 26. Since the O-rings 16 fitted in the inner circumferential grooves 32 and 33 of the thick flange portions 30 and 31 provide seals between the separator tube 15 and the cylinder 2, it is possible to prevent deformation of the separator tube 15 which could otherwise be caused by the hydraulic pressure, and prevent the extraction of the O-rings 16 from the cylinder apparatus 1 or prevent the O-rings 16 from falling out of the cylinder apparatus 1. As a result, the thickness of the cylinder 2 can be reduced, and therefore the overall weight can be reduced.

Figure 3:
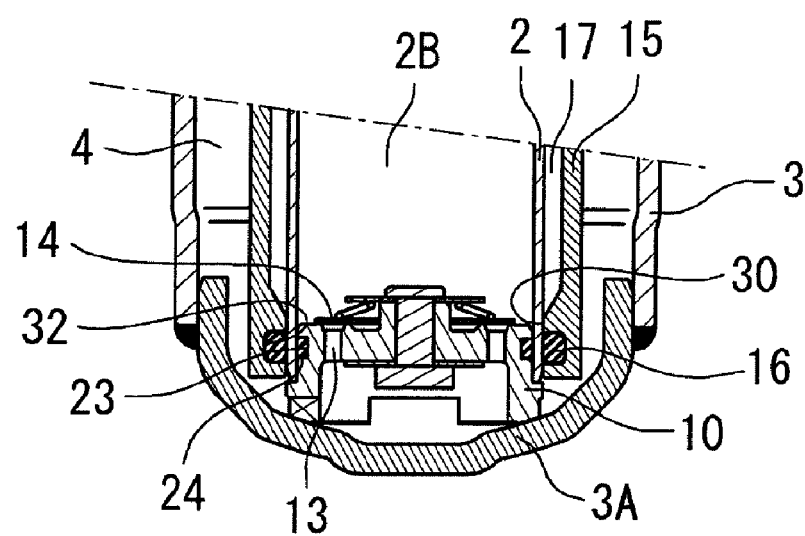
FIG. 3 is an enlarged view illustrating a base portion of a first variant of the cylinder apparatus shown in FIG. 1.

As shown in FIG. 3, the separator tube 15 may be configured such that the lower end of the separator tube 15 extends to a position near the lower end of the cylinder 2 so that the inner circumferential groove 23 containing the O-ring 16 of the separator tube 15 can be aligned with the outer circumferential groove 23 containing the O-ring 24 of the base valve 10, and such that the upper end of the separator tube 15 extends to a position near the upper end of the cylinder 2 so that the inner circumferential groove 33 containing the O-ring 16 of the separator tube 15 can be aligned with the outer circumferential groove 25 containing the O-ring 26 of the cylindrical portion 8A of the rod guide 8. In this case, it is possible to minimize the area of the cylinder 2 where a differential pressure between the inside and outside thereof affects.

Figure 4:
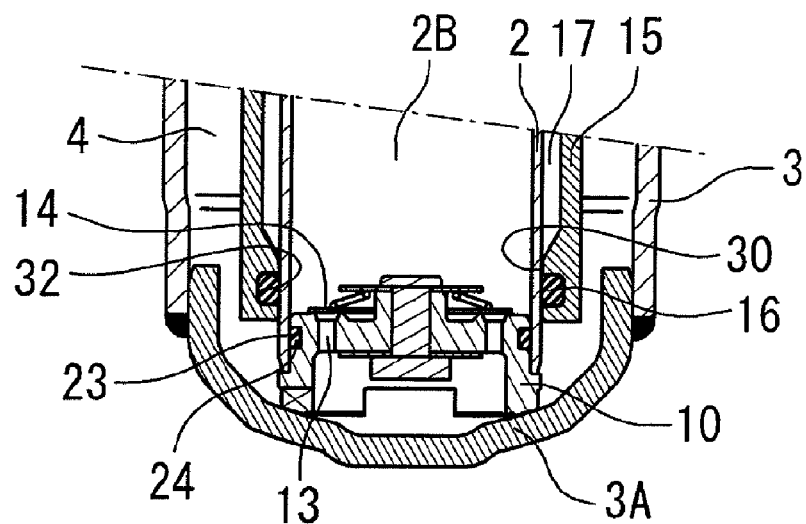
FIG. 4 is an enlarged view illustrating a base portion of a second variant of the cylinder apparatus shown in FIG. 1.

Alternatively, as shown in FIG. 4, the separator tube 15 may be configured such that the lower end of the separator tube 15 slightly overlaps the base valve 10 and the upper end of the separator tube 15 slightly overlaps the cylindrical portion 8A of the rod guide 8. Even in this case, it is possible to reduce deformation of the respective ends of the cylinder 2 according to an extent of the overlapping. Further alternatively, the separator tube 15 may be configured such that the lower and upper ends of the separator tube 15 respectively do not overlap the base valve 10 and the cylindrical portion 8A of the rod guide 8 at all, as long as the lower and upper ends of the separator tube 15 respectively extend to positions sufficiently near or adjacent to the base valve 10 and the cylindrical portion 8A so that the lower and upper ends of the separator tube 15 can be sufficiently respectively pressed against the portions of the cylinder 2 fitted to the base valve 10 and the cylindrical portion 8A from the outer circumferential sides thereof.

Figure 5:
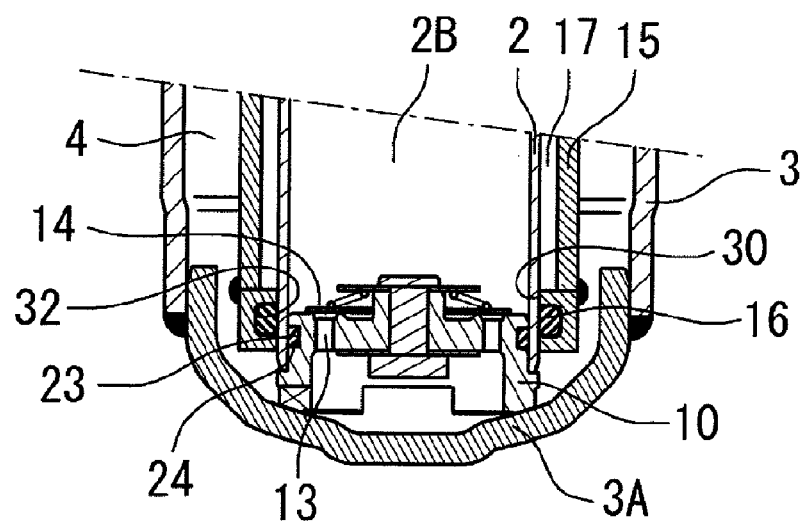
FIG. 5 is an enlarged view illustrating a base portion of a third variant of the cylinder apparatus shown in FIG. 1.
Figure 6:
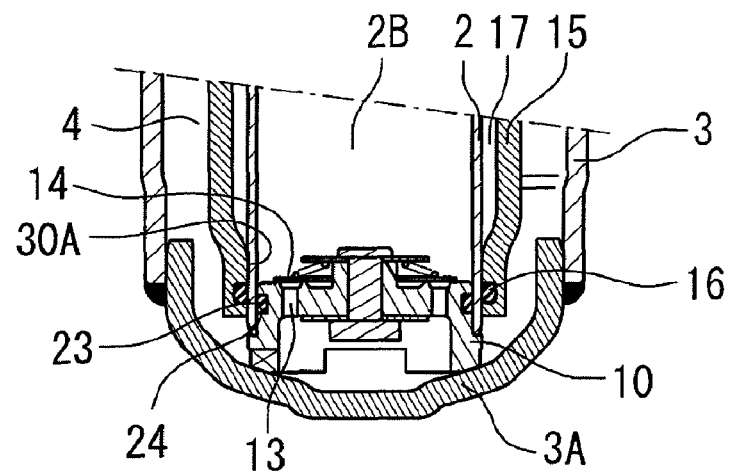
FIG. 6 is an enlarged view illustrating a base portion of a fourth variant of the cylinder apparatus shown in FIG. 1.

In the above-mentioned embodiment, as shown in FIG. 5, the flange portions 30 and 31 may be prepared as separate bodies from the separator tube 15, and may be integrally attached to the separator tube 15 by welding (FIG. 5 shows only the base valve 10 side). Alternatively, as shown in FIG. 6, instead of providing the flange portions 30 and 31 at the respective ends of the separator tube 15, the respective ends of the separator tube 15 may be tapered so as to have reduced diameters, thereby forming reduced diameter portions 30A and 31A (only the portion 30A is shown) sized to be fitted to the outer circumferences of the cylinder 2 (FIG. 6 only shown the base valve 10 side).

In the above-mentioned embodiment, the outer circumferential grooves 25 and 23 are formed at the portions of the rod guide 8 and the base valve 10 fitted to the cylinder 2, and the O-rings 26 and 24 as seal members are disposed in the outer circumferential grooves 25 and 23 for providing seals between the rod guide 8 and the base valve 10, and the cylinder 2. Alternatively, the rod guide 8 and the base valve 10 may be configured to be press-fitted in the cylinder 2, so that the outer circumferential grooves 25 and 23 as well as the O-rings 26 and 24 can be omitted, and therefore the number of the required parts can be reduced.

Figure 7:
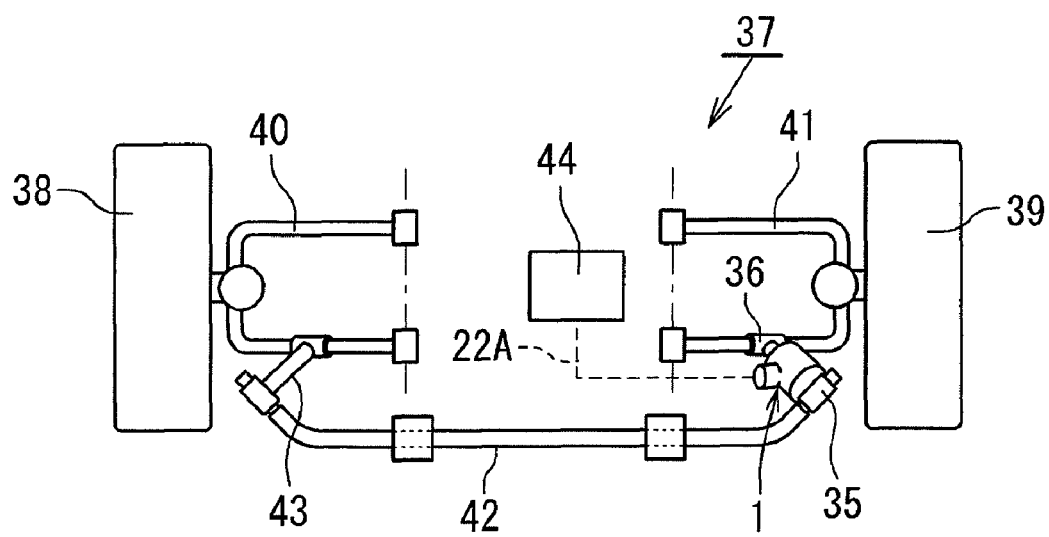
FIG. 7 is a schematic view illustrating a stabilizer apparatus employing the cylinder apparatus shown in FIG. 1.

Next, a stabilizer apparatus employing the cylinder apparatus 1 will be described with reference to FIG. 7. As shown in FIG. 7, a stabilizer apparatus 37 comprises a torsion bar 42 extending in the lateral direction of a vehicle so as to link a pair of suspension arms 40 and 41 supporting left and right wheels 38 and 39. The torsion bar 42 is supported rotatably respective to a vehicle body (not shown). The torsion bar 42 has one end coupled via a link bracket 43 to the suspension arm 40 which is one of the pair of suspension arms, and the other end coupled via the cylinder apparatus 1 to the suspension arm 41 which is the other of the pair of suspension arms. The other end of the torsion bar 42 is coupled to the mounting portion 35 at the piston rod 6 of the cylinder apparatus 1. The mounting eye 36 at the lower end of the outer cylinder 3 of the cylinder apparatus 1 is coupled to the suspension arm 41.

The lead wire 22A of the electromagnetic open/close valve 22 of the cylinder apparatus 1 is connected to a controller 44. The controller 44 controls open and close of the electromagnetic open/close valve 22 by outputting a control electric current to the electromagnetic open/close valve 22 through the lead wire 22A according to the running conditions of the vehicle based on detection results of various sensors (not shown) for detecting the conditions of the vehicle, such as an acceleration sensor and a steering angle sensor.

According to this configuration, when the electromagnetic open/close valve 22 is opened, the piston rod 6 of the cylinder apparatus 1 is allowed to perform an extension or compression stroke. Therefore, the spring force of the torsion bar 42 does not affect a stroke of the suspension arm 40 or 41, and thereby the torsion bar 42 does not function as a stabilizer. On the other hand, when the electromagnetic open/close valve 22 is closed, the piston rod 6 of the cylinder apparatus 1 is locked. Therefore, the torsion bar 42 functions as a stabilizer due to the connection of the left and light suspension arms 40 and 41 through the torsion bar 42. In this way, it is possible to appropriately enable or disable the stabilizer function according to the running conditions of the vehicle by the controller 44, so that it becomes possible to improve the ride comfort and the controllability/stability of the vehicle.

When the piston rod 6 is locked, an extremely high hydraulic pressure equal to or more than 26 Mpa may be generated at the cylinder apparatus 1, but the cylinder 2 and the separator tube 15 of the cylinder apparatus 1 are tolerant of such a high pressure.

The cylinder apparatus 1 of the above-mentioned embodiment may be employed as a shock absorber for applying a damping force to an extension or compression (contraction) stroke of the piston rod 6, by replacing the electromagnetic open/close valve 22 with a damping valve adapted to control a flow of the hydraulic fluid from the annular hydraulic passage 17 to the reservoir 4. The cylinder apparatus 1 may be disposed between the unsprung side and the sprung side of a suspension system of a vehicle such as an automobile to be used to apply a damping force to a stroke of the suspension.

According to the cylinder apparatus of the present invention, it is possible to prevent deformation of the cylinder and the separator tube which could otherwise be caused by an increase in the hydraulic pressure, so as to improve the pressure resistance.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority under 35 U.S.C. section 119 to Japanese Patent Application No. 2009-128905, filed on May 28, 2009.

The entire disclosure of Japanese Patent Application No. 2009-128905 filed on May 28, 2009 including specification, claims, drawings and summary is incorporated herein by reference in its entirety.

What is claimed is:

1. A cylinder apparatus, comprising:
   a cylinder sealingly containing hydraulic fluid;
   a piston slidably inserted in the cylinder, the piston dividing the interior of the cylinder into a first chamber and a second chamber;
   a piston rod coupled to the piston, the piston rod having an end extending to the outside of the cylinder;
   a separator tube disposed around the cylinder, the separator tube defining an annular passage between the separator tube and the cylinder, the annular passage connected to the interior of the cylinder;
   an outer cylinder disposed around the separator tube, the outer cylinder defining a reservoir between the outer cylinder and the separator tube, the reservoir sealingly containing the hydraulic fluid and gas;
   a first member including a first fitted portion fitted inside an end of the cylinder, the first member separating the first chamber and the reservoir;
   a second member including a second fitted portion fitted inside an opposite end of the cylinder, the second member separating the second chamber and the reservoir;
   a passage allowing a flow of the hydraulic fluid via the annular passage by a sliding movement of the piston in the cylinder;
   a valve unit disposed at the passage;
   a third fitted portion formed at an end of the separator tube, the third fitted portion including a first inner circumferential groove and being fitted to the outer circumference of the cylinder;
   a fourth fitted portion formed at an opposite end of the separator tube, the fourth fitted portion including a second inner circumferential groove and being fitted to the outer circumference of the cylinder;
   a first seal member disposed in the first inner circumferential groove of the third fitted portion, the first seal member providing a seal between the separator tube and the cylinder; and
   a second seal member disposed in the second inner circumferential groove of the fourth fitted portion, the second seal member providing a seal between the separator tube and the cylinder;
   wherein the end of the separator tube extends to a position adjacent to the first member, such that the end of the cylinder is pressed against the first fitted portion of the first member fitted inside the end of the cylinder from the outer circumferential side thereof by the third fitted portion formed at the end of the separator tube,
   wherein the opposite end of the separator tube extends to a position adjacent to the second member, such that the opposite end of the cylinder is pressed against the second fitted portion of the second member fitted inside the opposite end of the cylinder from the outer circumferential side thereof by the fourth fitted portion formed at the opposite end of the separator tube,
   wherein the end of the separator tube extends to a position such that the end thereof overlaps the first fitted portion of the first member which is fitted inside the end of the cylinder, and
   wherein the opposite end of the separator tube extends to a position such that the opposite end thereof overlaps the second fitted portion of the second member which is fitted inside the opposite end of the cylinder.

2. The cylinder apparatus of claim 1, wherein a first outer circumferential groove is formed at the first fitted portion of the first member which is fitted inside the end of the cylinder, and a third seal member for providing a seal between the first member and the cylinder is disposed in the first outer circumferential groove.

3. The cylinder apparatus of claim 2, wherein the separator tube extends to a position such that the first inner circumferential groove at the end thereof overlaps the first outer circumferential groove of the first member.

4. The cylinder apparatus of claim 1, wherein a second outer circumferential groove is formed at the second fitted portion of the second member which is fitted inside the opposite end of the cylinder, and a fourth seal member for providing a seal between the second member and the cylinder is disposed in the second outer circumferential groove.

5. The cylinder apparatus of claim 4, wherein the separator tube extends to a position such that the second inner circumferential groove at the opposite end thereof overlaps the second outer circumferential groove of the second member.

6. The cylinder apparatus of claim 1, wherein at least one of the end and the opposite end of the separator tube has a greater thickness than the other portions of the separator tube.

7. The cylinder apparatus of claim 6, wherein the thickened at least one of the end and the opposite end of the separator tube is prepared as a separate body from the separator tube, and is integrally attached to the separator tube by welding.

8. The cylinder apparatus of claim 1, wherein at least one of the end and the opposite end of the separator tube is tapered to have a reduced diameter.

9. A stabilizer apparatus, comprising:

a torsion bar supported rotatably relative to a vehicle body, the torsion bar having one end side coupled to one of a pair of suspension members supporting left and right wheels, and the other end side coupled to the other of the pair of suspension members through the cylinder apparatus recited in claim 1.

10. A stabilizer apparatus, comprising:

a torsion bar supported rotatably relative to a vehicle body, the torsion bar having one end side coupled to one of a pair of suspension members supporting left and right wheels, and the other end side coupled to the other of the pair of suspension members through the cylinder apparatus recited in claim 2.

\* \* \* \* \*